(12) United States Patent
Chang

(10) Patent No.: US 6,904,509 B2
(45) Date of Patent: Jun. 7, 2005

(54) METHOD FOR DATA REPRODUCING FROM AN OPTICAL STORAGE DEVICE

(75) Inventor: Kuo-Chiang Chang, Taipei (TW)

(73) Assignee: Lite-On It Corporation, Taipei (TW)

( * ) Notice: Subject to any disclaimer, the term of this patent is extended or adjusted under 35 U.S.C. 154(b) by 375 days.

(21) Appl. No.: 10/256,058

(22) Filed: Sep. 27, 2002

(65) Prior Publication Data

US 2003/0086343 A1 May 8, 2003

(30) Foreign Application Priority Data

Nov. 2, 2001 (TW) .................................. 90127261 A

(51) Int. Cl.[7] .............................................. G06F 12/08
(52) U.S. Cl. ................................... 711/713; 369/47.32
(58) Field of Search ........................ 711/713; 369/47.32

(56) References Cited

U.S. PATENT DOCUMENTS 5,727,232 A * 3/1998 Iida et al. ..................... 710/56
5,860,089 A * 1/1999 Ishii ........................... 711/112

FOREIGN PATENT DOCUMENTS

JP 10-171713 * 6/1998 ........... G06F/12/08

* cited by examiner

*Primary Examiner*—A M Psitos
(74) *Attorney, Agent, or Firm*—Thomas, Kayden, Horstemeyer & Risley

(57) ABSTRACT

A method for data reproducing from an optical storage device. The method is used to improve the usage efficiency of buffer memory of the storage device. Date that is already transferred to the host computer is considered as "cache hit". Thus, when data near one address is read again, the storage device need not do tracking, reading and decoding. Data in buffer memory is directly transferred to the host computer. It significantly improves the reproducing efficiency of the optical storage device.

5 Claims, 5 Drawing Sheets

METHOD FOR DATA REPRODUCING FROM AN OPTICAL STORAGE DEVICE

BACKGROUND OF THE INVENTION

1. Field of the Invention

The present invention relates to a method for data reproducing from a compact disk (CD-ROM) drive, particularly to a method for data reproducing from a CD-ROM drive wherein the range of Cache Hit addresses is the maximum size of the buffer memory so that the data reproducing efficiency is enhanced by a high Cache Hit ratio.

2. Description of the Prior Art

The continuous progress of technology has produced various kinds of optical storage devices, such as CD-ROM, CD-R, CD-RW and DVD-ROM drives etc. Most of them rotate at a maximum speed more than 20×. The maximum reproducing speed of CD-ROM drive at 1× is 150 Kbps which is the normal speed for music CD (CD-DA) playback. That is to say, most of the optical storage devices have a maximum reproducing speed more than 20× (20×150 Kbps=3 Mbps).

However, the above-mentioned reproducing speed is used when the data is read by sequential access method. Random data access is likely to be carried out at a speed less than 1/10 of the maximum reproducing speed of optical disk drives. Disk drives spend much time in tracking, reading and decoding. Therefore, a buffer memory is used to temporarily store data already accessed or pre-stored part of data from the disk so that the data reproducing is improved by Cache Hit.

The Cache Hit ratio is proportional to the size of the buffer memory. Data is transmitted directly from the buffer memory to a host, and tracking, reading and decoding are skipped when the data already exists in the buffer memory.

In conventional optical storage devices, when the data stored in the buffer memory is transferred to the host, it is regarded as Cache Miss. That is to say, Cache Hit indicates that data are decoded and waiting to be transferred to the host. As shown in FIG. 1, a buffer memory 11 has a maximum size of N (e.g. megabyte). The data read from the disk is stored in an address R 111, the decoded data is stored in an address D 112 and the transferred data is stored in an address T 113. The boundary of the buffer memory is B 114. The data stored between the boundary B114 and T 113 is regarded as Cache Miss. Only the data stored in the address between D 112 and T 113 is considered as Cache Hit. The Cache Hit addresses are located between T and T+X1. Thus, even though the data is stored between the boundary B 114 and T 113 and remain in the buffer memory, the data is regarded as Cache Miss.

The above-mentioned method for Cache Hit is suitable for data reproducing by sequential access but not random access. Therefore, the optical storage devices adapted to UDF (Universal Disc Format) and using random access, such as CD-R/RW drives, will have a low Cache Hit ratio and the data reproducing speed will be fairly low with the conventional method.

SUMMARY OF THE INVENTION

For purpose of the present invention, the term "CD drive" as used herein shall mean and include conventional CD, CD-RW, DVD-RW, DVD+RW and DVD+R drives, as well as all optical recorders.

Therefore, the object of the present invention is to provide a method for data reproducing from a CD drive wherein the range of Cache Hit addresses include transferring block and decoding block of the buffer memory, so that the data reproducing speed is enhanced by a high Cache Hit ratio.

The present invention provides a method for data reproducing from a CD drive with a buffer memory having a first, second and third area temporarily storing data that is read from an optical disk to a host. The method comprises the steps of (a) reading first data from the optical disk and storing the first data in the first area of the buffer memory, (b) decoding the first data and storing the decoded first data in the second area of the buffer memory, (c) transferring the decoded first data to the host and storing the transferred first data in the third area of the buffer memory, and (d) transferring second data that is read from the optical disk directly from the second and third area of the buffer memory to the host when the second data exists in the second and third area, otherwise, repeating the steps (a)~(d) until data reproducing is finished.

Thus, in the present invention, the Cache Hit ratio is increased by extending the range of memory addresses for Cache Hit to the transferring block of the buffer memory, which achieves high data reproducing efficiency.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Figure 1:
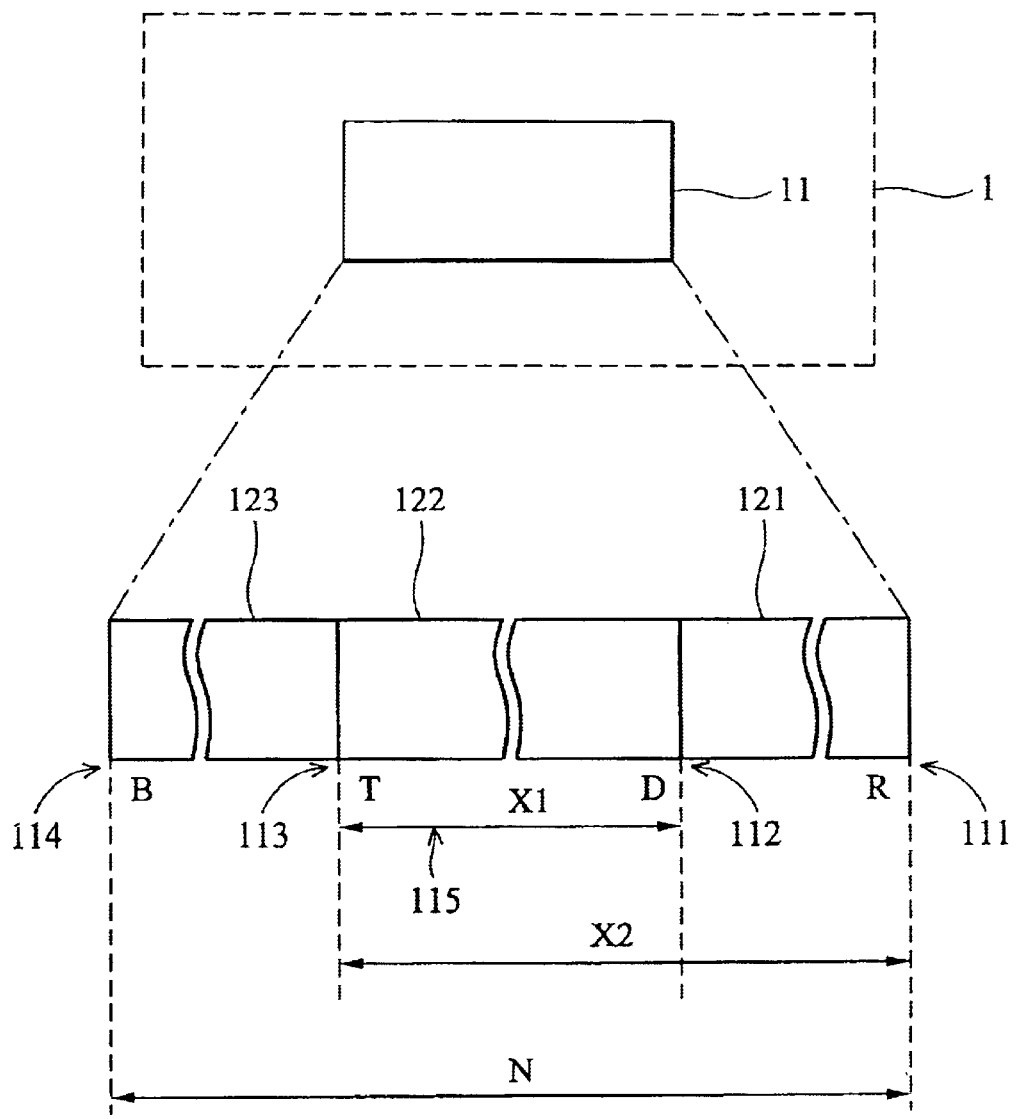
FIG. 1 is a diagram showing a structure of the addresses of the buffer memory in a conventional optical storage device.
Figure 2:
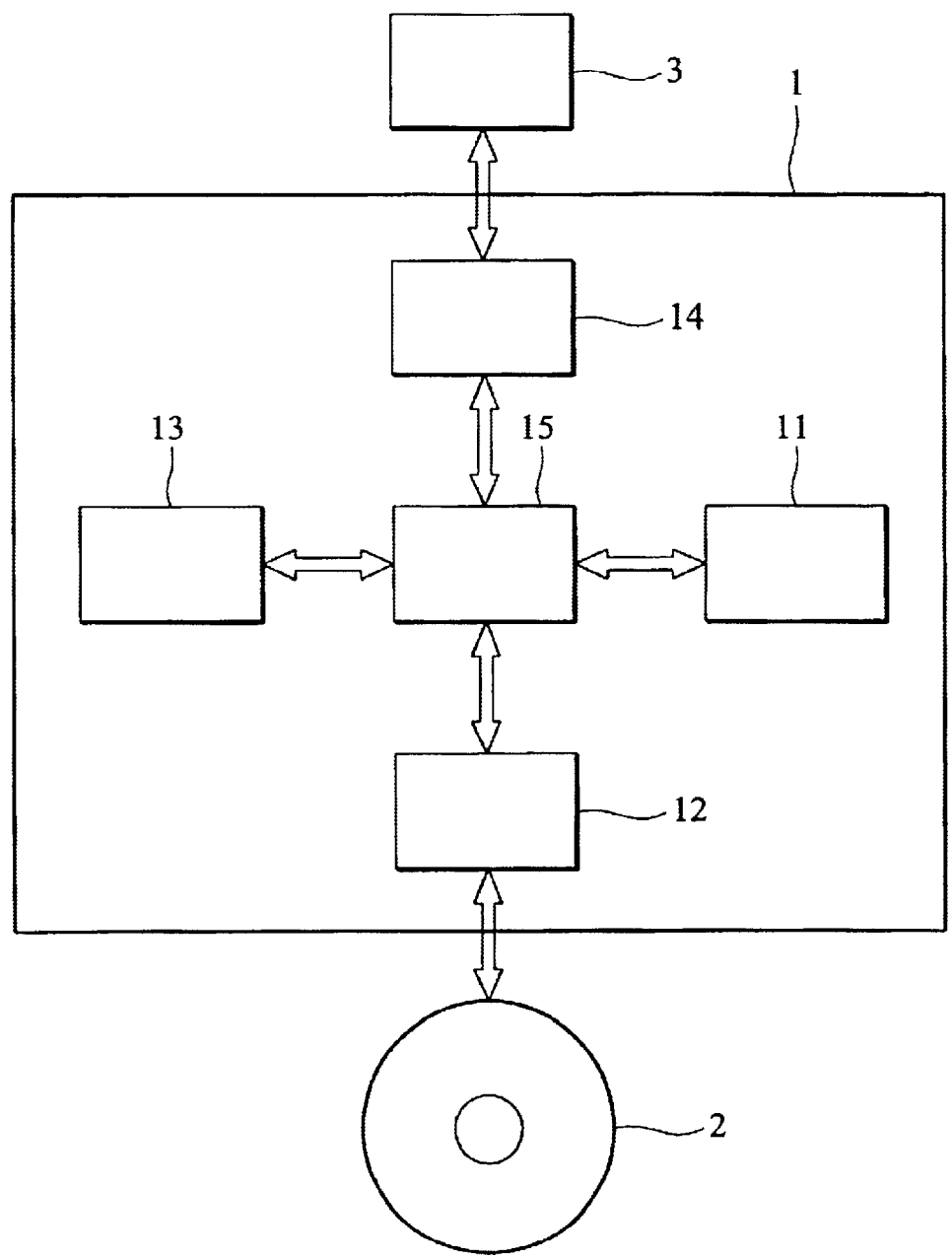
FIG. 2 is a diagram showing a system for data reproducing from an optical storage device according to one embodiment of the invention.

FIG. 2 is a diagram showing a system for data reproducing from an optical storage device according to one embodiment of the invention. The CD drive 1 reads data from an optical disk 2 to a host 3 such as a computer, CPU or storage accessing device such as a sound card and hard disk drive.

The CD drive 1 comprises a reading device 12 to read data from the optical disk 2, a decoder 13 to decode the data that is read from the optical disk 2, a buffer memory 11 to temporarily store the data that is read from the optical disk 2, the data decoded by the decoder and the decoded data transferred to the host 3, a transferring device 14 to transfer the decoded data to the host 3, and a microprocessor 15.

Figure 3:
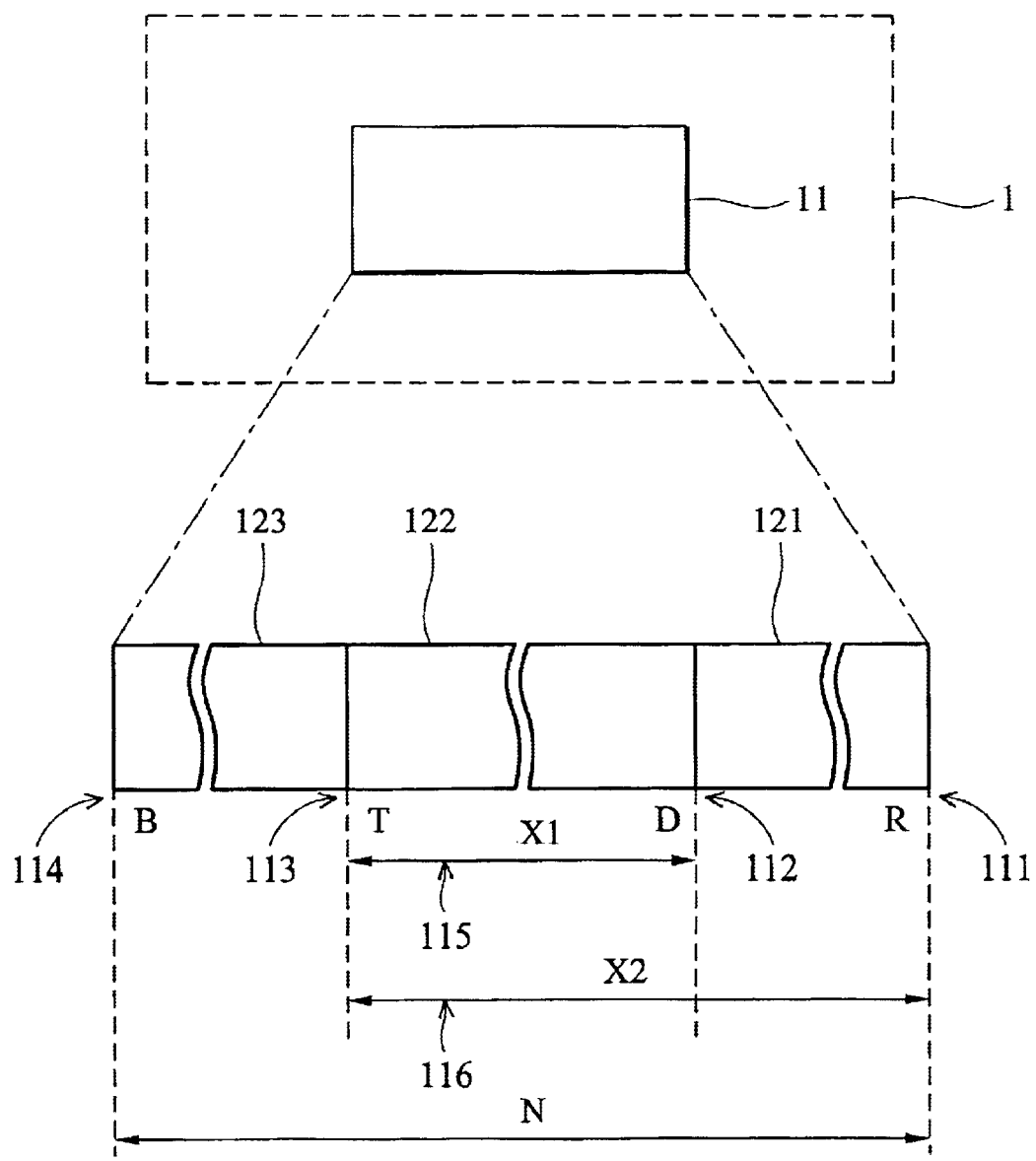
FIG. 3 is a diagram showing the addresses of the buffer memory in an optical storage device according to one embodiment of the invention.

As shown in FIG. 3, the buffer memory 11 has a maximum size of N (e.g. megabyte) and is divided into three areas 121, 122 and 123. The data read from the optical disk 2 is stored in an address R 111, the decoded data is stored in an address D 112 and the transferred data is stored in an address T 113. The boundary address of the buffer memory is B 114. The area 121 comprises the addresses between R 111 and D 112. The area 122 comprises the addresses between D 112 and T 113. The area 123 comprises the addresses between T 113 and B 114.

The addresses in the area 122 and 123 are for Cache Hit and, addresses in the area 121 are for Cache Miss due to the data stored therein not being decoded. The addresses D 112 and T 113 are variable, and the address R 111 and the maximum size N of the buffer memory is fixed. Therefore, the range of the addresses for Cache Hit is also variable. The addresses for Cache Hit are located between T+X2+B−N and T+X1, wherein X2 is a difference between addresses R 111 and T 113 respectively of the read data and the transferred data, and X1 is a difference between addresses D 112 and T 113 respectively of the decoded data and the transferred data. Boundary B is used to prevent the buffer memory to be overwritten by the data from the disk.

Figure 4A:
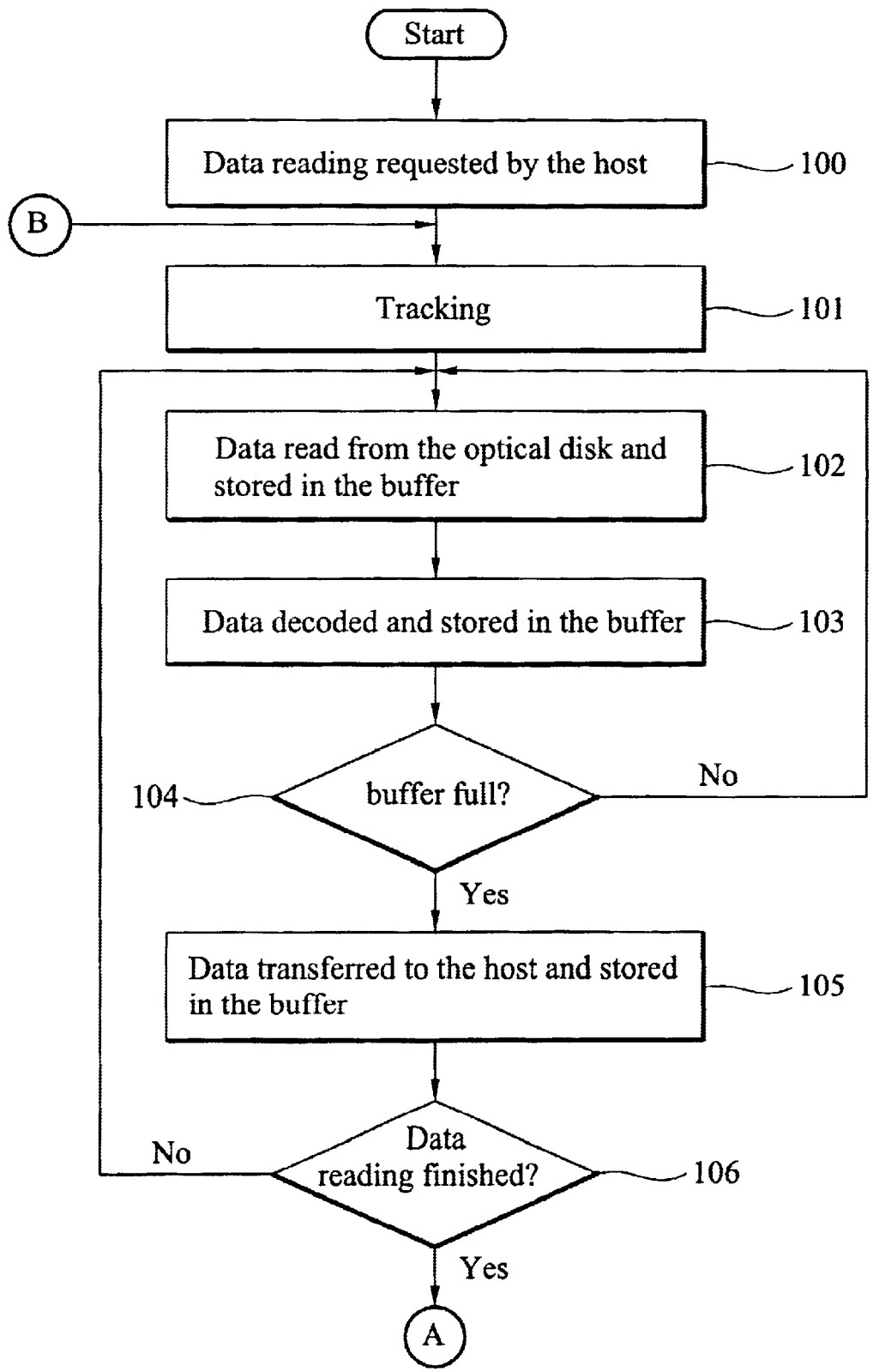
FIGS. 4A and 4B are diagrams showing the method for data reproducing from an optical storage device according to one embodiment of the invention.
Figure 4B:
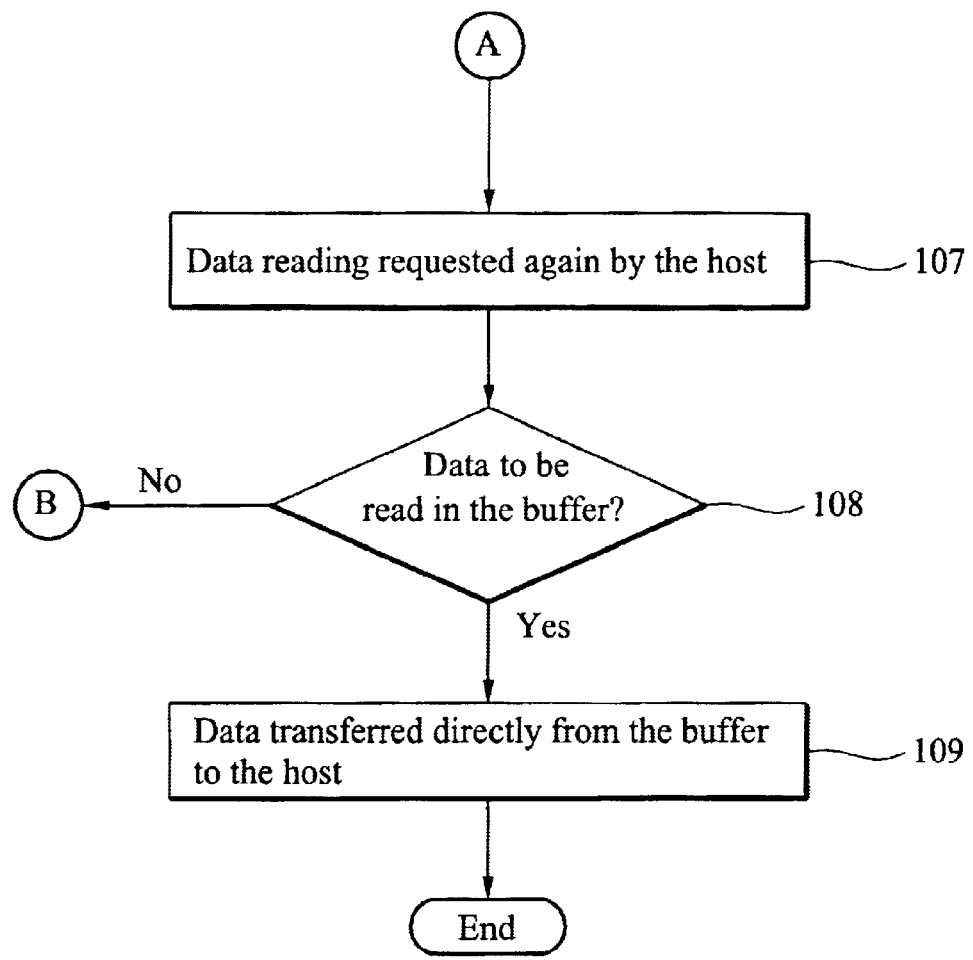

FIGS. 4A and 4B are diagrams showing the method for data reproducing from an optical storage device according to one embodiment of the invention. The method will be explained in conjunction with FIGS. 4A and 4B as well as FIG. 2.

In step 100, the host 3 requests the CD drive 1 to read data from the optical disk 2.

In step 101, the CD drive 1 begins tracking and reads data from the optical disk 2. Processing proceeds to step 102.

In step 102, the data is read from the optical disk 2 and stored in the area 121 of the buffer memory 11. Processing proceeds to step 103.

In step 103, the data stored in the area 121 is decoded by the decoder 13, and the decoded data is stored in the area 122 of the buffer memory 11. Processing proceeds to step 104.

In step 104, The microprocessor 15 determines whether or not the buffer memory 11 is full. The data is continuously read from the optical disk 2 (step 102) and decoded by the decoder 13 (step 103) until the buffer memory 11 is full. If the buffer memory is full, processing proceeds to step 105. Otherwise, processing then returns to step 102.

In step 105, when the buffer memory 11 is full, the CD drive 1 stops reading data from the optical disk 2, and the decoded data stored in the area 122 is transferred to the host 3 by the transferring device 14 and stored in the area 123 until all the data stored in the area 122 is transferred. Processing proceeds to step 106.

In step 106, when the data reproducing is not finished, the reading device 12 again begins to read data from the optical disk 2. That is, if no, processing returns to step 102. If the data reading is finished, processing proceeds to step 107.

In step 107, the host 3 again requests the CD drive 1 to read data from the optical disk 2. Processing proceeds to step 108.

In step 108, the microprocessor 15 determines whether or not the data that is read already exists in the area 122 and 123 of the buffer memory 11. If yes, the CD drive need not do tracking again and processing proceeds to step 109. If no, the data is read from the optical disk 2 and stored in the area 121 of the buffer memory 11 when it is not in the area 122 and 123. Processing returns to step 101.

In step 109, the CD drive 1 transfers the data that is read directly from the area 122 and 123 of the buffer memory 11 to the host 3 by the transferring device 14 when the data exists in the memory area 122 and 123. The processing is completed in this step.

In conclusion, the present invention provides a method for data reproducing from an optical storage device. By extending the range of memory addresses for Cache Hit to the transferring block of the buffer memory, the Cache Hit ratio is increased. This achieves high data reproducing efficiency for optical storage devices.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for data reproducing from an optical storage device with a buffer memory having first, second and third areas temporarily storing data to be read from an optical disk to a host, the method comprising the steps of:

(a) reading first data from the optical disk and storing the first data in the first area of the buffer memory;

(b) decoding the first data and storing the decoded first data in the second area of the buffer memory;

(c) transferring the decoded first data to the host and storing the transferred first data in the third area of the buffer memory; and (d) transferring second data that is read from the optical disk directly from the second and third area of the buffer memory to the host when the second data exists in the second and third area, otherwise, repeating the steps (a)~(d) until data reproducing is finished.

2. The method as claimed in claim 1, wherein memory addresses in the second and third area are for Cache Hit.

3. The method as claimed in claim 2, wherein the addresses for Cache Hit are located between T+X2+B−N and T+X1.

4. The method as claimed in claim 3, wherein T is an memory address of the transferred first data, X2 is a difference between addresses of the read first data and the transferred first data, B is a boundary address of the buffer memory, N is the maximum size of the buffer memory, and X1 is a difference between addresses of the decoded first data and the transferred first data.

5. The method as claimed in claim 1 further comprising the step of:

transferring the first data that is read from the optical disk directly from the second and third area of the buffer memory to the host when the first data exists in the second and third area.

* * * * *